United States Patent
Tiede et al.

(10) Patent No.: US 12,379,228 B2
(45) Date of Patent: Aug. 5, 2025

(54) TRAILER ODOMETER

(71) Applicants: Randy L. Tiede, North Grosvenordale, CT (US); Karen K. Tiede, North Gorsvenordale, CT (US)

(72) Inventors: Randy L. Tiede, North Grosvenordale, CT (US); Karen K. Tiede, North Gorsvenordale, CT (US)

( * ) Notice: Subject to any disclaimer, the term of this patent is extended or adjusted under 35 U.S.C. 154(b) by 849 days.

(21) Appl. No.: 17/525,052

(22) Filed: Nov. 12, 2021

(65) Prior Publication Data

US 2022/0187099 A1   Jun. 16, 2022

Related U.S. Application Data

(60) Provisional application No. 63/126,244, filed on Dec. 16, 2020.

(51) Int. Cl.
G01C 22/02 (2006.01)
B60B 7/06 (2006.01)

(52) U.S. Cl.
CPC ............. G01C 22/02 (2013.01); B60B 7/066 (2013.01)

(58) Field of Classification Search
CPC ....... G01C 22/02; B60B 7/066; B60B 7/0013; B60B 27/0068
See application file for complete search history.

(56) References Cited

U.S. PATENT DOCUMENTS

| | | | | |
|---|---|---|---|---|
| 1,488,631 A * | 4/1924 | Berge | ............... | G01C 22/00 235/96 |
| 1,544,079 A * | 6/1925 | Veeder | ............... | G01C 22/00 235/91 R |
| 1,716,385 A * | 6/1929 | Rossberg | ............... | F16B 39/02 411/190 |
| 2,638,274 A * | 5/1953 | Engler | ............... | G01C 22/00 235/95 B |
| 3,198,430 A * | 8/1965 | Hermann | ............... | G06M 1/062 235/98 C |
| 3,356,298 A * | 12/1967 | Crilly | ............... | G01C 22/00 235/95 C |
| 4,156,131 A * | 5/1979 | Haynes | ............... | G06M 3/12 235/95 B |
| 4,506,147 A * | 3/1985 | Powell | ............... | G01C 22/00 235/96 |

(Continued)

FOREIGN PATENT DOCUMENTS

| EP | 83243 A * | 7/1983 | ............ G01C 22/00 |
|---|---|---|---|
| EP | 195737 A * | 9/1986 | ............ G01C 22/02 |
| WO | WO-2018132881 A1 * | 7/2018 | ............ G01C 22/00 |

*Primary Examiner* — Yaritza Guadalupe-McCall
(74) *Attorney, Agent, or Firm* — Brennan, Manna & Diamond, LLC

(57) ABSTRACT

The present invention relates to a trailer odometer for measuring distance travelled by a trailer and other performance information. The trailer odometer is designed to be connected to a wheel hub, and features a counter for measuring axle/wheel rotation, a conversion unit for converting rotations into distance in miles/kilometers and a wireless transmission module for transmitting distance information to a remote electronic device. In one potential embodiment, an electrical box, designed to be an aftermarket product, performs the same or similar function and can be positioned/mounted near a hitch of the trailer.

17 Claims, 9 Drawing Sheets

(56) References Cited

U.S. PATENT DOCUMENTS

| | | | | |
|---|---|---|---|---|
| 4,563,574 | A * | 1/1986 | Dreyer | G01C 22/00 |
| | | | | 235/96 |
| 4,918,295 | A * | 4/1990 | Sauber | G01C 22/00 |
| | | | | 235/96 |
| 5,410,478 | A * | 4/1995 | Richard | B62D 55/065 |
| | | | | 180/9.1 |
| 6,011,827 | A * | 1/2000 | Kyrtsos | G01C 22/02 |
| | | | | 377/16 |
| 6,519,516 | B2 * | 2/2003 | Pfaeffle | G07C 5/08 |
| | | | | 340/426.28 |
| 6,547,128 | B1 * | 4/2003 | Shimura | G01C 22/00 |
| | | | | 235/95 B |
| 6,646,432 | B1 * | 11/2003 | Malinowski | A63C 17/26 |
| | | | | 324/171 |
| 6,768,966 | B2 * | 7/2004 | Ohle | G01C 22/02 |
| | | | | 702/165 |
| 6,940,940 | B2 * | 9/2005 | Kranz | G01P 7/00 |
| | | | | 377/24.1 |
| 8,352,210 | B2 * | 1/2013 | Kranz | G01C 22/02 |
| | | | | 702/158 |
| 10,697,793 | B2 * | 6/2020 | Stewart, Jr. | G01C 22/02 |
| 11,940,292 | B2 * | 3/2024 | Guo | G01C 22/00 |
| 2009/0099724 | A1 * | 4/2009 | Kranz | G01F 15/063 |
| | | | | 701/33.4 |
| 2021/0396544 | A1 * | 12/2021 | Guo | G01C 21/165 |
| 2022/0187099 | A1 * | 6/2022 | Tiede | B60B 7/066 |
| 2023/0213341 | A1 * | 7/2023 | Dickinson | G01C 21/1652 |
| | | | | 342/61 |
| 2023/0213355 | A1 * | 7/2023 | Dickinson | G06M 1/10 |
| | | | | 235/95 C |

\* cited by examiner

TRAILER ODOMETER

CROSS-REFERENCE TO RELATED APPLICATION

The present application claims priority to, and the benefit of U.S. Provisional Application No. 63/126,244, which was filed on Dec. 16, 2020 and is incorporated herein by reference in its entirety.

FIELD OF THE INVENTION

The present invention relates generally to the field of trailers. More specifically, the present invention relates to a trailer travelling distance, state, condition and/or performance monitoring device that can be integrated during manufacturing or as an aftermarket product to the trailer. The trailer travelling distance, state, condition and/or performance monitoring device is in the form of a trailer odometer and an electrical box. The trailer odometer is configured to connect to a wheel hub and the electrical box is positioned near a hitch of the trailer. The rotations of the axle/wheels are measured and converted into miles/kilometers, and the information is wirelessly transmitted to a remote handheld device for monitoring. Accordingly, the present disclosure makes specific reference thereto. Nonetheless, it is to be appreciated that aspects of the present invention are also equally applicable to other like applications, devices, and methods of manufacture.

BACKGROUND OF THE INVENTION

By way of background, trailers are unpowered vehicles towed by another powered vehicle. Typically, a vehicle is connected to a trailer, and the former then transports or pulls the trailer as the vehicle is driven. Trailers are generally used for transport of goods and materials or can be used as mobile homes as well. In the United States, trailers ranging in size from single-axle flat-bed trailers, to 6-axle, 13.5-foot (4.1 m) high, 53-foot (16.2 m) long semi-trailers are commonplace. Due to their high usage, individuals purchase a lot of secondhand or used trailers as well.

Due to advancements in the technologies related to powered vehicles, individuals can receive information about the state or performance of the wheels, such as number of miles travelled, braking efficiency, wheel bearing condition and the like. A vehicle onboard display and odometer display provides real-time information to the users. However, individuals generally do not receive such information about the wheels of the trailer, and this can lead to individuals being unaware of braking efficiency, wheels status and maintenance requirements of the trailer. Also, individuals generally buy used trailers without knowledge of the condition of wheels; and, without knowledge of the miles travelled by the trailer, the condition of brakes and other maintenance issues.

Since the trailer often travels behind different vehicles, the mileages of the vehicles and trailer generally do not agree or correspond to one another. Therefore, desired accurate information regarding mileage of a trailer is typically lacking.

In most cases, pull-behind trailers utilize one or more electrical connections between a vehicle pulling the trailer, and the trailer itself, to power the various components of the trailer. Using these electrical connections, some information of the trailer is displayed on the odometer of the connected vehicle, but it has its drawbacks. Once the trailer is hitched to some other vehicle, then the information of the trailer is lost and the historical information of the trailer cannot be used or compiled accurately by individuals.

Also, in a conventional cabling system of the trailers, generally functionality is limited in what it may be used for, because it is often electrically-connected to deliver power only to specific portions of the trailer lighting system. The truck is usually configured to provide power on a particular line, according to the activities of the driver (e.g. activating turn signals, applying brakes, etc.) thus the conventional system is limited by these specific connections.

Thus, in commercial trailers there is a need for a separate system, such as an odometer system, to check and receive certain data such as speed information, number of miles travelled and more about trailers without any additional circuitry to the connected vehicle.

Therefore, there exists a long felt need in the art for a trailer odometer system that monitors how many miles a trailer has travelled. There is also a long felt need in the art for a trailer odometer system that can be installed as an integrated unit or an aftermarket attachment. Additionally, there is a long felt need in the art for a trailer odometer system that can be used with any commercial non-powered trailer. Moreover, there is a long felt need in the art for a trailer odometer system that does not require any additional circuitry or connection to the connected vehicle. Further, there is a long felt need in the art for a trailer odometer system that stores monitored information in an internal memory for historical use and reference. Finally, there is a long felt need in the art for a trailer odometer system that allows individuals to detect and receive the status of the wheels of a trailer, thereby helping them in making decisions about maintenance of the trailer, and also providing information regarding the extent that trailers have been used before secondhand purchase.

The subject matter disclosed and claimed herein, in one embodiment thereof, comprises a wheel hub-mounted trailer odometer. The trailer odometer includes a circular frame that fits to the wheel hub of a trailer, a counter for counting rotations of the axle related to the wheel hub, a conversion module for converting the counter value to a distance value in miles or kilometers and a wireless communication module for transmitting the converted distance value to a remote device via a wireless communication channel. The odometer includes a back cup cover for protecting modules, and the odometer is fastened to the wheel hub using a plurality of lug nuts.

In this manner, the novel trailer odometer system of the present invention accomplishes all of the forgoing objectives, and provides a relatively easy, cost-effective and convenient system and method to immediately identify how many miles have been put on a trailer, to determine maintenance and repair procedures. Using the detected information, individuals can also make smart decisions regarding the purchase of second hand or used trailers. The number of miles can be automatically deduced from the wheels' rotation to enable individuals to make important decisions for improving the trailer safety and performance.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one potential embodiment thereof, comprises a wheel hub mounted trailer odometer. The trailer odometer further comprising a circular frame designed to be fit to the wheel hub of a trailer, a counter for counting rotations of axle related to wheel hub, a conversion module for converting the counter value to a distance value in miles or kilometers, a wireless communication module for transmitting the converted distance value to a remote device via a wireless communication channel and a cap or cover for protecting the modules wherein the odometer can be fastened to the wheel hub using a plurality of lug nuts. The trailer odometer can be connected to the wheel hub during manufacturing of the trailer, and helps in trailer maintenance and repairing. The user of the device may also recalibrate the device to account for different sized tires that would otherwise impact the mileage being recorded.

In yet another potential embodiment of the present invention, the trailer odometer wirelessly transmits the odometer information to the dashboard of a connected vehicle to which the trailer is attached through a hitch.

In yet another potential embodiment of the present invention, the wheel hub includes a magnetic switch or sensor that provides information of the complete wheel rotations to the counter of the trailer odometer.

In yet another embodiment, the trailer odometer also reports the mileage of the trailer and transmits same to the remote electronic device.

In yet another embodiment of the present invention, an electric box for measuring and reporting distance travelled by a trailer is disclosed. The electric box can be coupled to a front wheel of the trailer, and can be positioned near a hitch of the trailer. The electric box calculates the distance travelled by the trailer and reports to one or more of the remote electronic devices, dashboard or a fleet manager. The electric box can be used as an aftermarket add-on to the trailer for measuring the distance travelled and/or mileage of the trailer.

In yet another embodiment, a method for remotely identifying the distance travelled by a trailer is disclosed. The method includes the steps of integrating the trailer odometer to a wheel hub, monitoring and recording the axle/wheel rotation by the trailer odometer when trailer starts travelling, converting the wheel/axle rotation into the miles or kilometers of the distance travelled and wirelessly transmitting the distance value to a smartphone application installed in a smartphone using wireless communication medium.

In a further embodiment of the present invention, a method for calculating the distance travelled by a trailer using a detachably-attached electrical box is disclosed. The method includes positioning the electrical box to the trailer hitch to identify wheel rotation, initiating monitoring and recording the rotation of the wheels when the trailer starts travelling, converting the wheel/axle rotation into the miles or kilometers of the distance travelled and also transmitting the mileage information and the miles travelled to a smartphone application using a wireless communication medium.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents.

Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
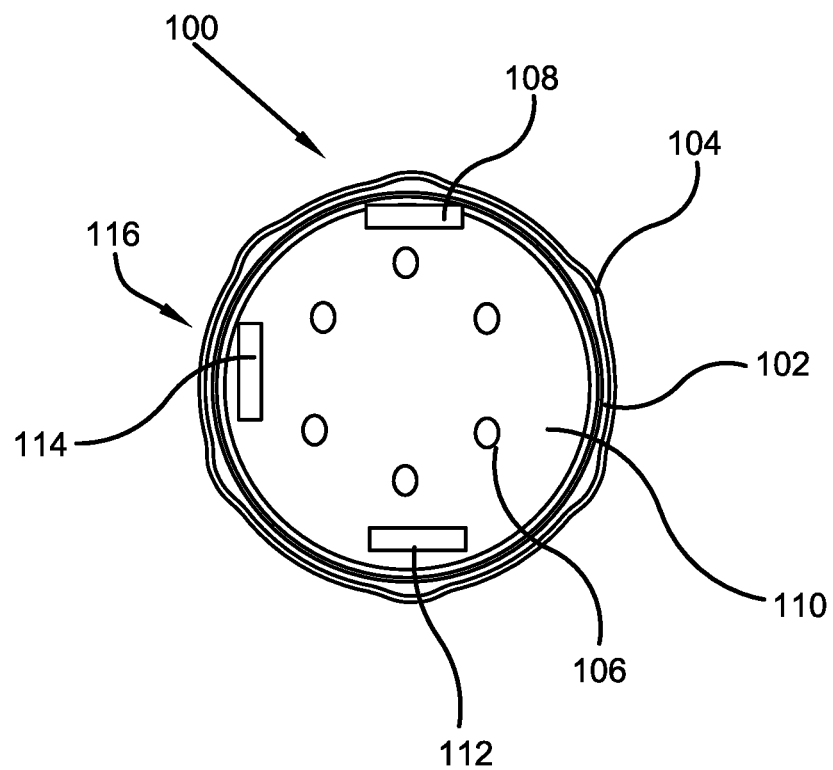
FIG. 1 illustrates a perspective view of one potential embodiment of a trailer odometer of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, Therefore, there exists a long felt need in the art for a trailer odometer system that monitors how many miles a trailer has travelled. There is also a long felt need in the art for a trailer odometer system that can be installed as an integrated unit or an aftermarket attachment. Additionally, there is a long felt need in the art for a trailer odometer system that can be used with any commercial non-powered trailer. Moreover, there is a long felt need in the art for a trailer odometer system that does not require any additional circuitry or connection to the connected vehicle. Further, there is a long felt need in the art for a trailer odometer system that stores monitored information in an internal memory for historical use and reference. Finally, there is a long felt need in the art for a trailer odometer system that allows individuals to detect and receive the status of the wheels of a trailer, thereby helping them in making decisions about the maintenance of the trailer, and also providing information regarding the extent that trailers have been used before secondhand purchase.

The present invention, in one potential embodiment, includes a novel electric box for measuring and reporting the distance travelled by a trailer. The electric box can be coupled to a front wheel of the trailer, and can be positioned near a hitch of the trailer. The electric box calculates the distance travelled by the trailer and reports to one or more of the remote electronic devices, dashboard or a fleet manager. The electric box can be used as an aftermarket add-on to the trailer for measuring the distance and mileage of the trailer.

Referring initially to the drawings, FIG. 1 illustrates a perspective view of a trailer odometer of the present invention in accordance with the disclosed architecture. The trailer odometer 100 of the present invention can be in the form of a portable device that can be mounted to a wheel hub of a trailer wheel. More specifically, the trailer odometer 100 can be circular in shape, and dimensioned to mount to the wheel hub of the trailer wheel. The odometer 100 includes a circular periphery 102 that has a plurality of protrusions or mounts 104 to securely fit to the wheel hub. The odometer 100 includes a plurality of lug nut holes 106 so that the odometer 100 can fit in between the wheel hub and a trailer wheel using the conventional lug nuts.

Figure 2:
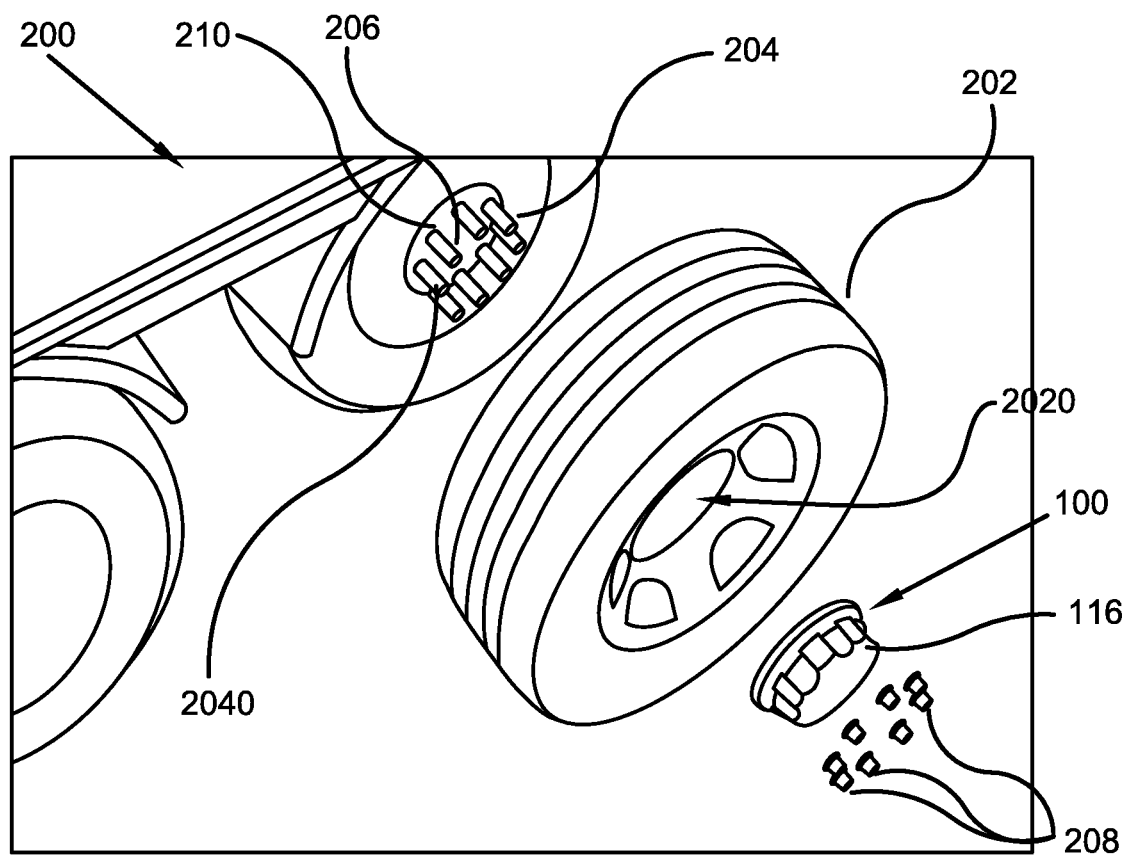
FIG. 2 illustrates a perspective view of one potential embodiment showing how the trailer odometer of the present invention is attached to a wheel hub of a trailer in accordance with the disclosed architecture.

A counter 108 can be disposed on the inner surface 110 of the trailer odometer 100, thereby allowing magnetic switches disposed on the wheel hub, as shown best in FIG. 2, to increase the count when the magnetic switches detect one complete rotation of the wheel. For increasing the utility of the detected counter value, which can be a compilation of the number of wheel rotations, the counter value 108 can be converted into either kilometers or miles as per the preference of a user by a distance converter module 112. The trailer odometer 100 includes a wireless communication module 114 in the form of a small chip that transfers the detected distance traveled in miles or kilometers to a paired smartphone application and/or to an electrical box positioned near a hitch of the trailer, as described later in the disclosure.

The trailer odometer 100 can be constructed of a hard metal including lightweight components. To cover the sensors and other modules, the odometer 100 includes a metal or plastic cap or cover 116. The cap or cover 116 is removable, and can be removed to access the modules disposed in the odometer 100. The counter 108, converter module 112 and communication module 114 can be disposed on a single-printed circuit board disposed on inner surface 110 of the odometer 100. These components are stored securely in a housing created by the cap or cover 116 and the inner surface 110. It should be appreciated that the magnetic sensors in the present embodiment are disposed on the wheel hub of the trailer. However, magnetic sensors on the odometer 100 are also under the purview of the present invention.

FIG. 2 illustrates a perspective view showing how trailer odometer of the present invention is attached to a wheel hub of a trailer, in accordance with the disclosed architecture. The trailer odometer 100 is designed to connect to wheel hub 204 of a trailer 200, for detecting and recording the distance travelled by the trailer 202. It should be appreciated that since the odometer 100 is attached to the wheel hub 204, which is connected to the axle 210, when a new tire replaces the old tire/wheel 202, the total distance travelled by the trailer 200 remains stored and updated in the odometer 100. The odometer 100 measures the rotation of the axle 210 to which the wheel hub 204 is attached, for calculating the miles or kilometers travelled by the trailer 200.

As shown, the odometer 100 is dimensioned to fit to the wheel hub 204 through the central portion 2020 of the trailer wheel 202. The wheel hub 204 includes a magnetic sensor/switch 206 that actuates the counter (108 in FIG. 1) whenever a single rotation of the axle 210 (and accordingly the wheel 202 connected to the wheel hub 204) is completed. To fit the odometer 100 to the wheel hub 204, a plurality of lug nuts 208 is used. The conventional lug nuts 208 fasten to the bolts 2040 of the wheel hub 204, and helps in making a magnetic connection between the magnetic sensor 206 and the counter disposed on the inner surface of the odometer 100. Once, the odometer 100 is secured to the wheel hub 204, the cap or cover 116 is used for securing the odometer 100.

Figure 3:
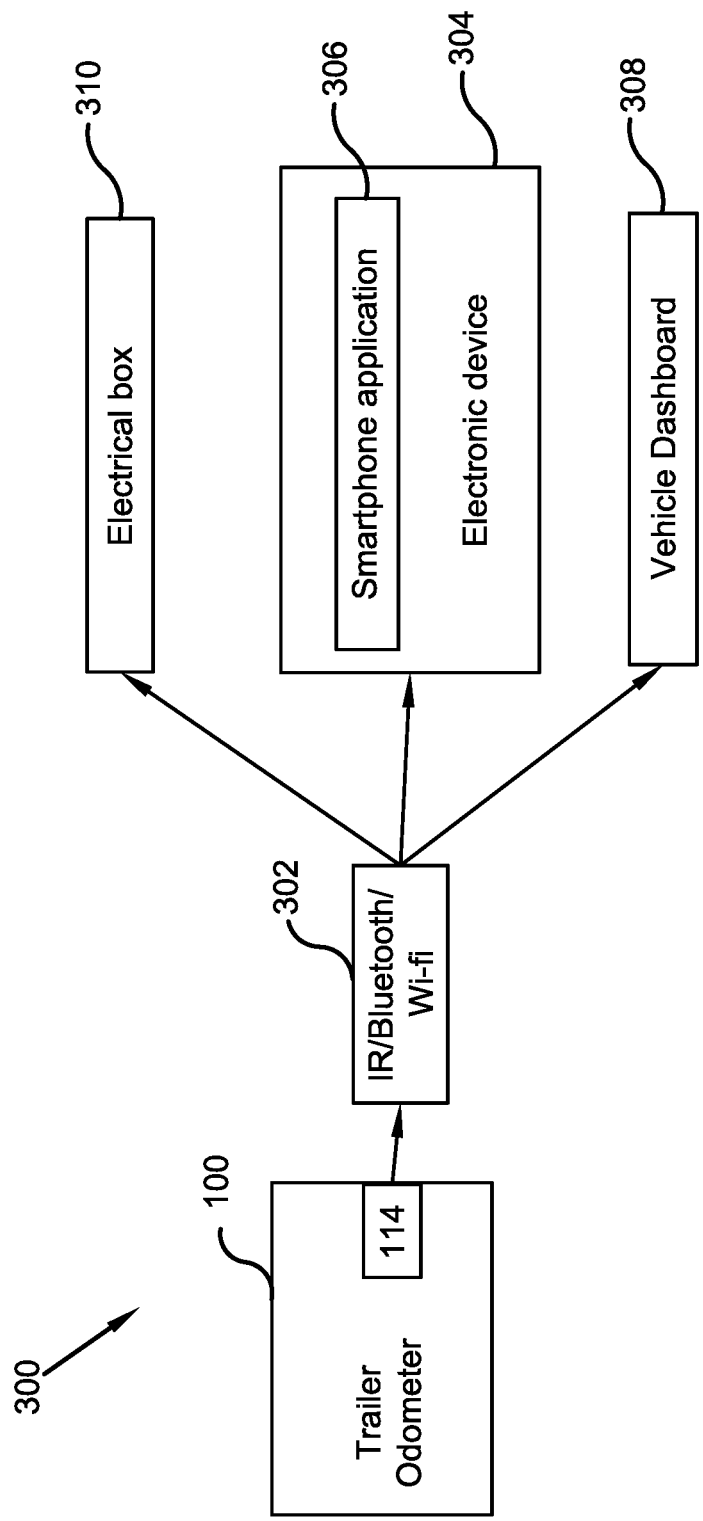
FIG. 3 illustrates a schematic view showing transmission of distance value travelled by the trailer recorded by the trailer odometer of the present invention to a remote location in accordance with the disclosed architecture.

FIG. 3 illustrates a schematic view 300 showing the transmission of the distance value travelled by the trailer, recorded by the trailer odometer of the present invention, to a remote location in accordance with the disclosed architecture. As stated earlier, the trailer odometer 100 of the present invention includes a wireless communication module 114 in the form of a chip that is configured to wirelessly transmit the detected miles or kilometers value of the distance travelled by the trailer to which the odometer 100 is mounted. The wireless communication module 114 establishes a wireless communication channel 302 in the form of an Infrared channel/Bluetooth/Wi-Fi/Radio Frequency transmission, to wirelessly transmit the odometer information to a location remote from the trailer and also allow the odometer 100 to be programmed, calibrated or otherwise controlled. In the present embodiment, the odometer information, i.e. the distance travelled by the trailer and/or mileage of the trailer, can be transmitted to a paired smartphone application 306 installed in an electronic device 304, such as a smartphone.

In addition to transmitting the information wirelessly to a remote location, the odometer 100 can transmit the information to a connected vehicle dashboard 308, thereby allowing a driver of the vehicle to instantly make a decision about the maintenance and repair of the trailer. This notification also reminds the driver of a scheduled maintenance of the trailer.

For other operators of the trailer, an electrical box 310 positioned near a hitch of the trailer also receives information wirelessly from the odometer 100, and displays the distance information along with any warning or advice to users. It should be appreciated that the odometer information can be transmitted in real-time, transmitted at scheduled intervals and/or transmitted upon request from a remote location as per the preferences of a user. Radio frequency (RF) transmission including active and passive RF tags, and can also be used for transferring the odometer information.

Figure 4:
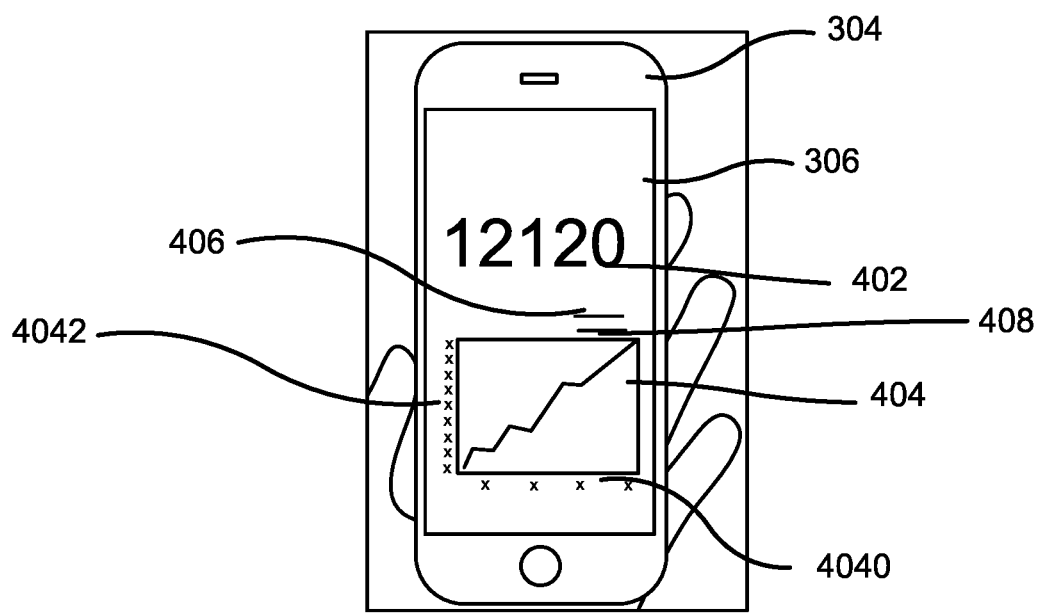
FIG. 4 illustrates an exemplary interface of a smartphone application displaying the received odometer information from the trailer odometer of the present invention in accordance with the disclosed architecture.

FIG. 4 illustrates an exemplary interface of a smartphone application displaying the received odometer information from a trailer odometer of the present invention in accordance with the disclosed architecture. The smartphone application 306 installed in a handheld electronic device 304 can display the odometer information in real-time for immediate action. Generally, the smartphone application 306 displays the received miles or kilometers value 402 in a digital format. It should be appreciated that in one potential embodiment of the present invention, the counter value from the odometer can be transmitted to the application 306, and the application 306 is configured to convert the received counter value into miles or kilometers.

Along with the digital value 402, a graph 404 showing historical values is also displayed. Specifically, the graph 402 includes time duration in days, weeks or months on the X-axis 4040, and the distance travelled in miles or kilometers can be shown on the Y-axis 4042. Additionally, the graph displays a comparison of the current values 406, with a templatized value graph 408, providing a user guidance if the trailer is in a safe condition to drive. The graph 404 also provides insights about the planned or scheduled maintenance of the trailer. The application 306 provides users with a control mechanism to alter the view or display from miles to kilometers and vice-versa. Also, a user can choose from a plurality of built-in graphs within the application 306 as per the preferences.

Figure 5:
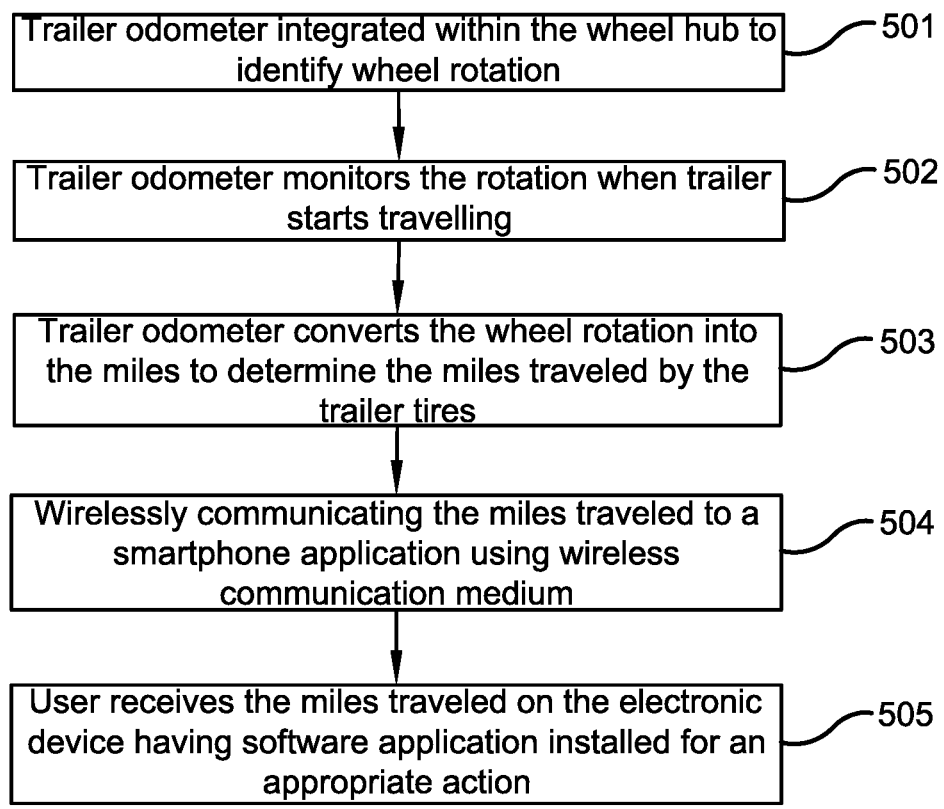
FIG. 5 illustrates a flow diagram showing exemplary steps performed for receiving the odometer information from the trailer odometer of the present invention in accordance with the disclosed architecture.

FIG. 5 illustrates a flow diagram showing exemplary steps performed for receiving odometer information from an odometer of the present invention in accordance with the disclosed architecture. Initially, the trailer odometer of the present invention is integrated and fastened within the wheel hub to identify and detect wheel rotations (Block 501). It should be noted that the trailer odometer can be integrated during the manufacturing of the trailer. The integrated trailer odometer can start monitoring and recording the rotation of the axle/wheel when the trailer starts travelling (Block 502). The trailer odometer includes a conversion module. The trailer odometer converts the wheel/axle rotations into miles or kilometers distance (Block 503). Using the wireless communication module, the odometer can wirelessly transmit the miles travelled to a smartphone application using the wireless communication medium (Block 504). Finally, the transmitted information is received by a user on a paired smartphone application, thereby allowing the user to take an appropriate remedial action for the trailer if required (Block 505).

It should be appreciated that the integrated trailer odometer is useful in purchasing of a used trailer, as the information recorded by the odometer can be used for identifying the remaining life of the trailer, and can be used to predict the necessary maintenance and repair requirements of the trailer.

Figure 6:
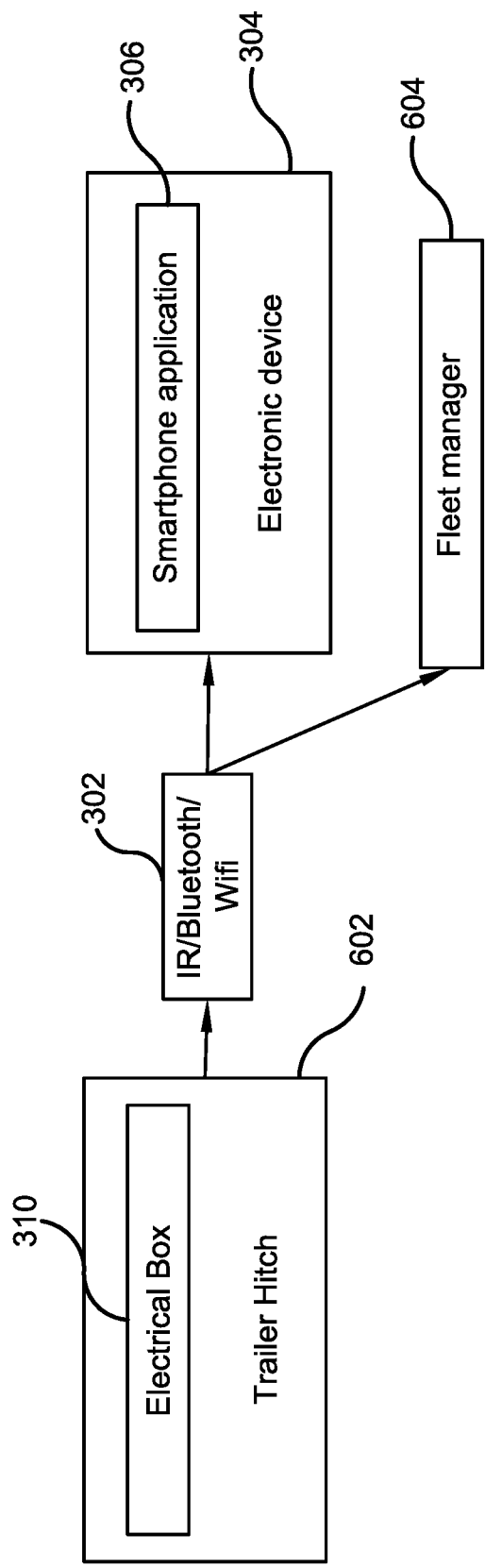
FIG. 6 illustrates a perspective view showing communication between the electrical box of the present invention with a remote electronic device in accordance with the disclosed architecture.

FIG. 6 illustrates a perspective view showing communication between the electrical box of the present invention with a remote electronic device in accordance with the disclosed architecture. As shown earlier in FIG. 3, the trailer odometer is configured to transmit information to the electrical box 310 positioned on or near a hitch of the trailer. The electrical box 310 includes a display for displaying the received or calculated miles or kilometers along with graphs. The electrical box 310 can also transmit the distance information wirelessly, using the wireless communication channel 302 to the smartphone application 306 installed in the electronic device 304. The electrical box 310 can also transmit the distance information to other parties such as a fleet manager 604, for example for taking appropriate action based on the value of the distance travelled. The electrical box 310 can also calculate the distance with the trailer odometer being temporarily connected to the wheel hub provided to users as an aftermarket option. The electrical box 310 can connect to the wheel hub for detecting accurate distance and mileage of the trailer.

Figure 7:
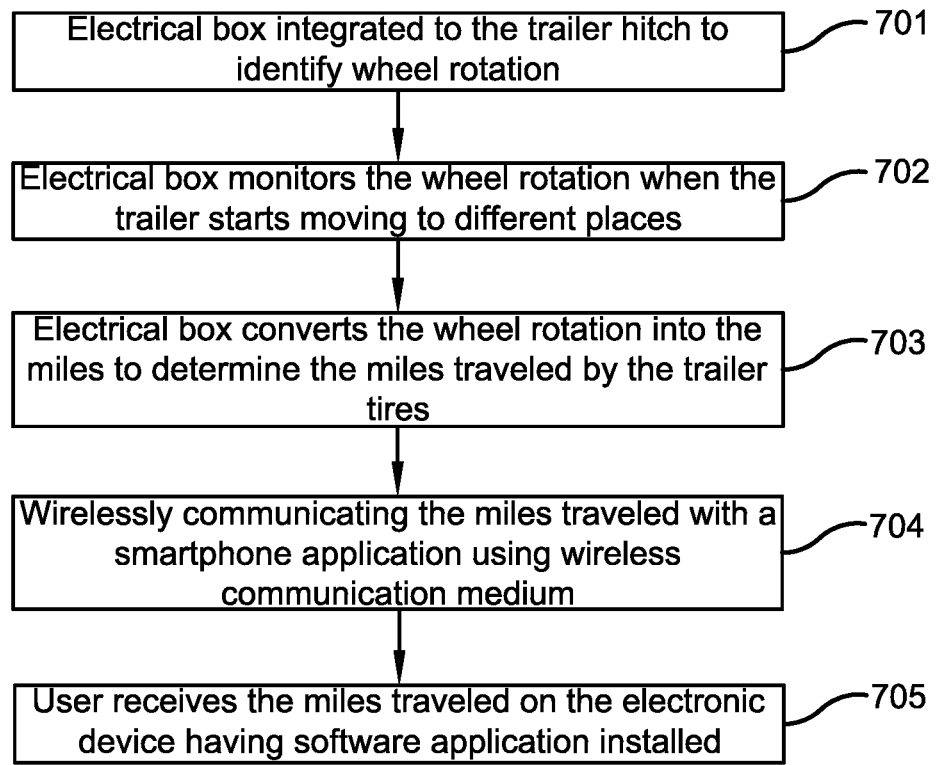
FIG. 7 illustrates a flow diagram showing exemplary steps performed for receiving odometer information from the electrical box of the present invention in accordance with the disclosed architecture.

FIG. 7 illustrates a flow diagram showing exemplary steps performed for receiving odometer information from the electrical box 310 of the present invention, in accordance with the disclosed architecture. Initially, the electrical box of the present invention is integrated and positioned with the trailer hitch to identify wheel rotation (Block 701). It should be noted that the electrical box can be integrated as an aftermarket product. Once installed and integrated, the electrical box can start monitoring and recording the distance and/or mileage travelled when the trailer starts moving (Block 702). The electrical box converts the wheel/axle rotation into the miles or kilometers distance, and can also record/retain the mileage information (Block 703). The electrical box can transmit the miles travelled to a smartphone application using a wireless communication medium (Block 704). The transmitted information can be received by a user on a paired smartphone application, thereby allowing the user to take an appropriate remedial action for the trailer if required (Block 705).

Figure 8:
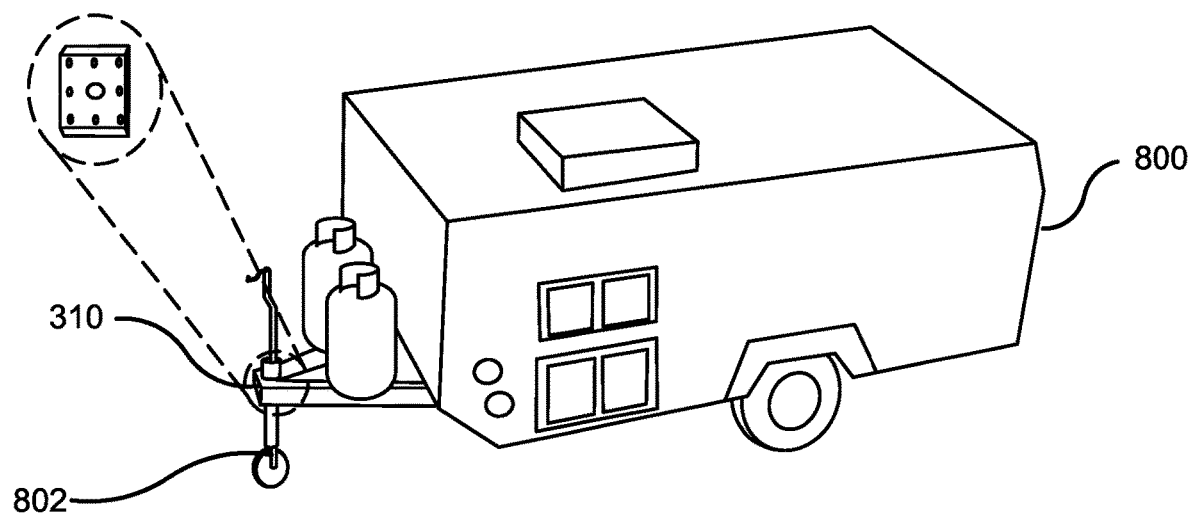
FIG. 8 illustrates a perspective view showing how the electrical box of the present invention is attached to a front wheel of a trailer in accordance with the disclosed architecture.

FIG. 8 illustrates a perspective view showing how the electrical box 310 of the present invention can be attached to a front wheel 802 of a trailer 800, in accordance with the disclosed architecture. The electrical box 310 can be configured to couple to the front tire/wheel 802 of the trailer 800 for recording the rotation of the front wheel 802, and converting the rotation into distance in miles or kilometers. It should be noted that the electrical box 310 can be installed as an aftermarket product on the trailer 800.

Figure 9:
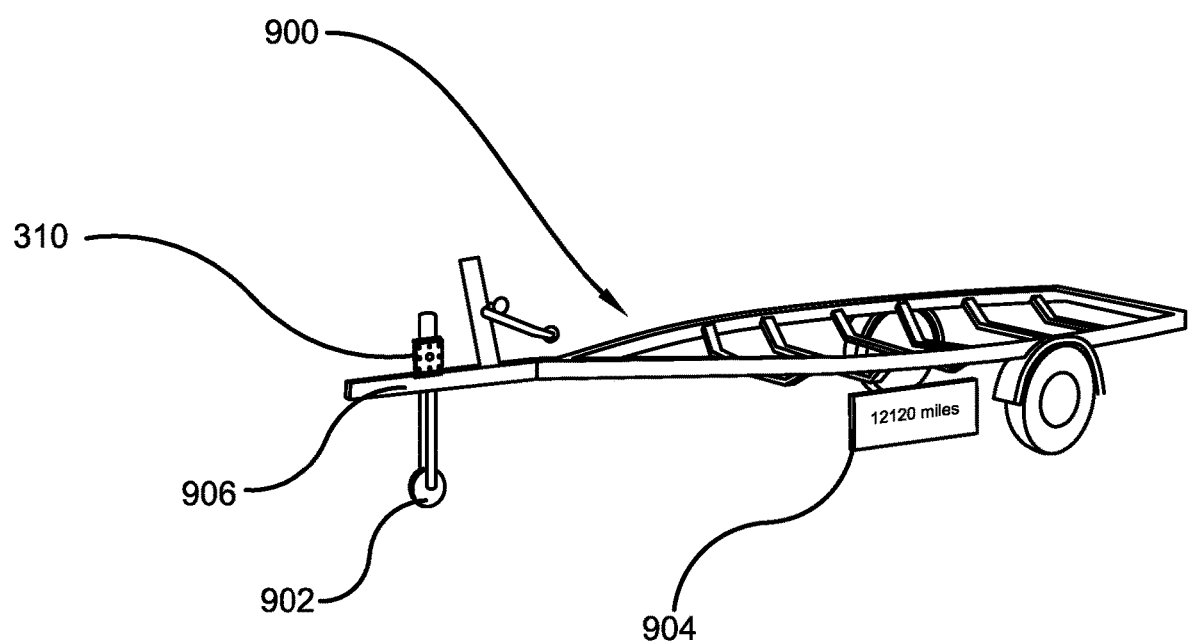
FIG. 9 illustrates another embodiment of the trailer with the electrical box attached to the hitch for measuring distance travelled by the trailer in accordance with the disclosed architecture.

FIG. 9 illustrates another embodiment of the trailer 900 with an electrical box 310 attached to the hitch 906, for measuring distance travelled by the trailer 900 in accordance with the disclosed architecture. As shown, the electrical box 310 is detachably-positioned near the hitch 906, and is coupled to the front wheel 902. Based on the detected and recorded distance value, a tag 904 having the recorded distance value can be placed on the trailer 900, thereby allowing a purchaser who wants to purchase the trailer 900 to obtain information about the condition and state of the trailer 900.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "trailer odometer", "odometer", "trailer distance measuring device", and "trailer odometer system" are interchangeable and refer to the trailer odometer 100 of the present invention.

Notwithstanding the forgoing, the trailer odometer 100 of the present invention can be of any suitable size and configuration as is known in the art without affecting the overall concept of the invention, provided that it accomplishes the above-stated objectives. One of ordinary skill in the art will appreciate that the size, configuration and material of the trailer odometer 100 as shown in the FIGS. are for illustrative purposes only, and that many other sizes and shapes of the multipurpose plate with the trailer odometer 100 are well within the scope of the present disclosure. Although the dimensions of the multipurpose plate with the trailer odometer 100 are important design parameters for user convenience, the trailer odometer 100 may be of any size that ensures optimal performance during use, and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wheel hub mounted trailer odometer comprising:
   an odometer comprising a mounting frame for insertion inside a wheel hub of a trailer, and a counter for counting a plurality of rotations of an axle connected to said wheel hub;
   a conversion module for converting said plurality of rotations to a converted distance value;
   a cover for protecting said odometer, wherein said odometer is fastenable to said wheel hub using a plurality of lug nuts; and
   a wireless communication module for transmitting said converted distance value to a remote device via a wireless communication channel; and
   wherein said wireless communication module further transmits said converted distance value to an electric connection integrated with said trailer.

2. The wheel hub mounted trailer odometer of claim 1, wherein said wireless communication module further transmits said converted distance value to a dashboard of a connected vehicle to said trailer.

3. The wheel hub mounted trailer odometer of claim 1, wherein said frame is a circular frame.

4. The wheel hub mounted trailer odometer of claim 1, wherein said converted distance value is selected from a group consisting of miles and kilometers.

5. The wheel hub mounted trailer odometer of claim 1, wherein said counter comprises a magnetic switch for counting said plurality of rotations.

6. The wheel hub mounted trailer odometer of claim 1, wherein said converted distance value is selected from a group consisting of miles and kilometers.

7. A wheel hub mounted trailer odometer comprising:
   an odometer including a mounting frame for insertion inside a wheel hub of a trailer and a counter for counting a plurality of rotations of an axle connected to said wheel hub;
   a conversion module for converting said plurality of rotations to a converted distance value, wherein said counter comprises a magnetic switch for counting said plurality of rotations;
   said converted distance value is selected from a group consisting of miles and kilometers; and
   a wireless communication module for transmitting said converted distance value to a remote device via a wireless communication channel; and
   wherein said wireless communication module further transmits said converted distance value to an electric connection integrated with said trailer.

8. The wheel hub mounted trailer odometer of claim 7, wherein said wireless communication module further transmits said converted distance value to a dashboard of a connected vehicle to said trailer.

9. The wheel hub mounted trailer odometer of claim 7, wherein said frame is a circular frame.

10. The wheel hub mounted trailer odometer of claim 7 further comprising a cover for protecting said odometer wherein said odometer is fastenable to said wheel hub using a plurality of lug nuts.

11. A method for remotely identifying a distance travelled by a trailer, the method comprising the steps of:
    integrating a trailer odometer to a wheel hub and an axle of said trailer;
    monitoring rotations of said axle of said trailer;
    recording said rotations of said axle by said trailer odometer when said trailer starts moving;
    converting said rotations of said axle into a distance travelled; and
    wirelessly transmitting said distance travelled to a smartphone application installed in a smartphone using a wireless communication medium; and
    wirelessly transmitting said distance travelled to an electric connection integrated with said trailer.

12. The method of claim 11, wherein said distance travelled is selected from a group consisting of miles and kilometers.

13. The method of claim 11 further comprising a step of wirelessly transmitting said distance travelled to a dashboard of a connected vehicle to said trailer.

14. The method of claim 11, wherein integrating said trailer odometer to said wheel hub and said axle of said trailer further comprises a counter, wherein said counter includes a magnetic switch for counting said rotations.

15. The method of claim 11, wherein said electrical connection monitors and records said distance travelled.

16. The method of claim 15, wherein said distance travelled is selected from a group consisting of miles and kilometers.

17. The method of claim 16 further comprising a step of wirelessly transmitting said distance travelled to a dashboard of a connected vehicle to said trailer.

* * * * *